July 5, 1949.  H. NYGAARD  2,475,457
ANTIHUNT POSITIONING APPARATUS
Filed Feb. 12, 1945  2 Sheets-Sheet 1

INVENTOR.
HERMAN NYGAARD
BY Richard A. Mersen
ATTORNEY

July 5, 1949.　　　　　H. NYGAARD　　　　　2,475,457
ANTIHUNT POSITIONING APPARATUS

Filed Feb. 12, 1945　　　　　　　　　　　2 Sheets-Sheet 2

INVENTOR.
HERMAN NYGAARD
BY
ATTORNEY

UNITED STATES PATENT OFFICE 2,475,457

ANTIHUNT POSITIONING APPARATUS

Herman Nygaard, East Orange, N. J., assignor, by mesne assignments, to Lear, Incorporated, Grand Rapids, Mich., a corporation of Illinois Application February 12, 1945, Serial No. 577,427

15 Claims. (Cl. 318—30)

This invention relates to anti-hunt positioning apparatus and more particularly to such apparatus including a sensitive, quick acting control circuit for a positioning motor which operates a movable member to stably follow up the movement of a position selector.

The apparatus of the present invention is particularly applicable to the remote control of the position of movable accessories on aircraft, for instance throttle controls, wing flaps, cowl flaps, landing gears, intercooler shutters, propeller speed governors, etc. On the larger aircraft, such movable accessories are usually positioned by means of a power driven linear actuator, the operation of which is remotely controlled from a position adjacent the pilot's compartment. The present invention provides presettable positioning or follow up control of the driven member throughout its positionable range.

Electrical motor drive systems are replacing the more bulky hydraulic systems in many instances on aircraft. The present invention provides continuous remote positioning control of the available motors on aircraft actuators, whether operated from a low voltage direct current or higher voltage 400 cycle source. To save excessive drain on the power source, the control system is designed so that the power is used by the actuator motor only during its actual operating periods. Furthermore, there is a wide variety in the sizes and types of drive motors used aboard a modern aircraft. Under certain conditions, the use of direct current motors may be indicated; and under other conditions, alternating current motors. Each motor must be particularly designed for its particular application on an aircraft, taking into consideration the type of power economically available thereon, the load, and other conditions.

The principles of the present invention are applicable to any type or size of motor to be controlled, affording smooth and rapid operation of the controlled member, accurately to its new positions. The pilot need merely turn a dial to the required indicated position, and the motor is controlled to effect that new position of the member. No "stand-by" or other current is required to flow through the motor during non-operating conditions. Thus no power is wasted, nor is the motor ambient temperature raised. This feature is essentially provided through the use of a relay control of the motor, as will be set forth hereinafter.

Another important feature is the provision of simple effective anti-hunt or stability characteristics in the motor control system. In accordance with the invention counter signal or electrical effects produced as a result of relative displacements of a position selector and the movable member, or as a result of the energization of the positioning motor, are combined with the positioning or input signal to the electronic control circuit. These counter signals effect an "anticipation" for the control of the final position, and eliminate hunting in the drive system.

A novel differential relay is provided to connect the positioning motor to a source of power for selective operation in reverse directions dependent upon the "sense" of the input signals. The relay is very sensitive, rendering it particularly effective on relatively small input signals to the electronic control circuit. In addition, the relay reduces the operating voltage applied to the motor as a result of relatively small input signals during periods of small relative displacements of the position selector and movable member. The motor thus operates at reduced speeds, during such small displacements, to further enhance the anti-hunting characteristics of the system. During relatively large positioning displacements, the relay applies full operating voltage to the motor until such time as the movable member and position selector are nearly in a coincident position. The operating voltage, and thus the speed of the motor, are then reduced during the final travel of the selector and movable member into coincident relation.

As a further anti-hunting provision, an electromagnetic clutch and brake unit is interposed between the motor and the actuator, and abruptly disconnects the motor from the actuator as the movable member approaches its final position. Simultaneously with such disconnection, the clutch and brake unit rapidly arrests motion of the actuator and driven member. At the same time, a brake is applied to the motor armature to rapidly decelerate the latter to condition the motor for potential operation in the reverse direction. Successive energization and deenergization of the clutch, brake and motor is afforded by the anticipation control to effect a stepping or chattering-in of the member to its final position. The clutch and brake unit is particularly effective in small, or "inching" movements as it disconnects the motor from the actuator and abruptly stops the latter. This further stabilizes the control system and can be made to effect rapid control movements on the member without hunting. Such stabilizing anticipation means is effective particularly for the relay controller for the motor, and renders such controller pactical and feasible, paticularly on aircraft.

It is among the objects of the present invention to provide an improved manual or automatic anti-hunt positioning apparatus including electronic follow-up means; to provide such apparatus which will insure rapid accurate positioning of a movable member driven by an electric motor; to provide such apparatus having a narrow "dead" or back-lash zone, while, at the same time, having maximum sensitivity to small displacements of the position selector; to provide such apparatus which is universally applicable irrespective of the type and size of motors to which it is applied or of the type of motor power supply available; to provide such apparatus in which counter signals derived as a result of relative displacement of a position selector and movable member, or as a result of energization of a positioning motor, are combined with the input signal to insure stability and anti-hunt characteristics in the system; to provide such apparatus including means for disconnecting the positioning motor from the actuator, abruptly stopping the latter and rapidly decelerating the motor armature when the positionable accessory is in coincidence with the position selector; to provide such apparatus including means for varying the operating voltage applied to the motor in accordance with the relative displacement of the position selector and the positionable accessory; to provide such apparatus in which no stand-by current is required for the drive motor; and to provide such apparatus which includes relatively few parts and is light in weight, simple and reliable in operation for all types of aircraft or flight conditions.

These and other objects, advantages and features of the invention will be apparent from the following description and the accompanying drawings. In the drawings.

Generally speaking, the apparatus of the present invention comprises a position selector operatively connected to a signal transmitter. The selector is effective to preselect the position of a movable member that is positioned by an actuator driven by an electric motor. A signal receiver is operatively associated with the actuator or the movable member, and electronic control means is provided in association with the signal receiver and the signal transmitter. The control means is operative, upon receipt of an input signal due to relative displacement of the position selector and the movable member, to selectively operate relay means to energize the actuator motor for operation in the direction to restore coincidence between the position selector and the movable member. When the movable member attains coincidence with the position selector, the electronic control means operates to deenergize the relay means to disconnect the motor from its source. To avoid hunting of the movable member on either side of such coincident position, counter signals in accordance with the relative displacement of the selector and the movable member, or responsive to energization of the motor for operating the positioning member, are combined with the input signal to effect accurate stopping of the movable member at the selected or coincident position.

The relay means comprises a differential relay, sensitive to small input signals, and effective to vary the value of the operating voltage applied from the power source to the motor in accordance with the magnitude of the input signal. As the magnitude of the input signal is a measure of the degree of relative displacement of the position selector and the movable member, the motor thus operates at less speed during relatively small displacements and at a greater speed during relatively large displacements. This improves the anti-hunt characteristics of the system as the operating speed of the motor is reduced when the position selector and the movable member are near a coincident position.

The anti-hunt characteristics of the system are further improved by the use of an electromagnetic clutch and brake unit between the motor and actuator, which unit operates, upon deenergization of the motor, to substantially instantaneously stop the actuator and rapidly decelerate the motor armature. This feature of the system affords accurate control in small or "inching" movements of the movable member, and rapidly conditions the motor for potential operation in the reverse direction.

Figure 1:
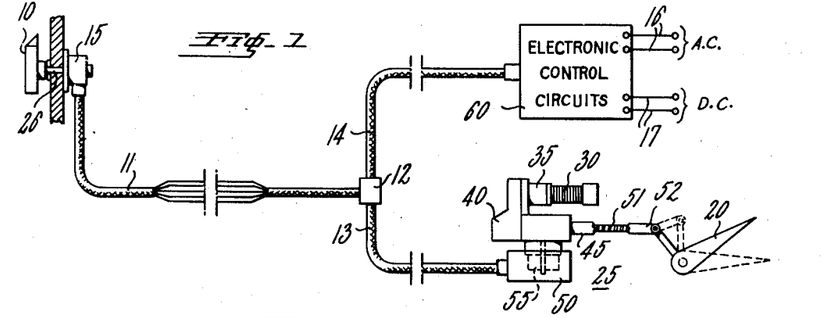
Fig. 1 is a schematic view of one embodiment of an anti-hunt positioning apparatus for a power actuated aircraft accessory, in accordance with the present invention.

Referring to the drawings, the system illustrated in Fig. 1 includes a position selector 10 operatively connected to a position signal transmitter 15. The position selector is arranged to control the position of a movable member 20 which may be, for example, a wing flap of an aircraft. Movable member 20 may be power operated by means of an actuator unit 25, which may be similar to the type described and claimed in the copending application of William P. Lear, Serial No. 483,515, filed April 17, 1943, now Patent No. 2,469,269, for "Unitary mechanical actuator device," and assigned to the assignee of the present application. Actuator unit 25 includes a motor 30 connected through an electromagnetic clutch and brake unit 35 and gear train 40 to a jack screw 45. Clutch and brake unit 35 differs from that described in said copending application in that it also includes brake means for rapidly decelerating the armature of motor 30 upon deenergization of the motor. A control box 50 is included in the actuator assembly and contains limit swtiches, and in the present case, a position signal receiver 55. A multi-conductor cable 11 connects signal transmitter 15 to a junction box 12, which, in turn, is connected by multi-conductor cables 13 and 14 to control box 50 of actuator unit 25 and electronic control circuit unit 60. Leads 16 connect unit 60 to a source of alternating current and leads 17 connect the unit to a source of direct current.

Figure 2:
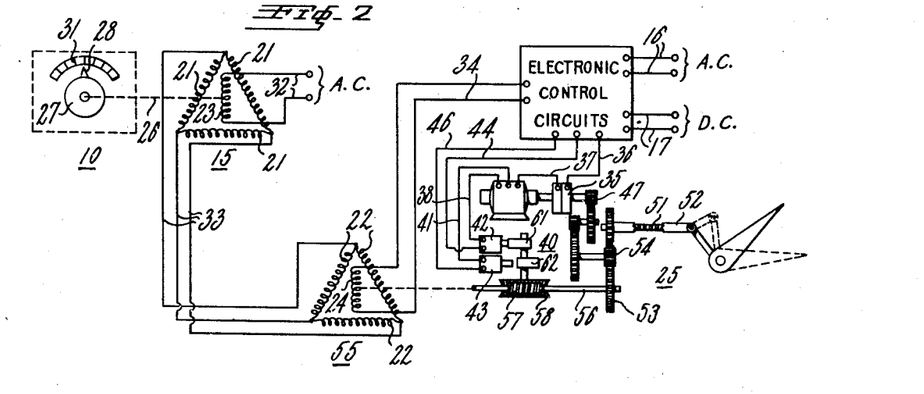
Fig. 2 is a schematic diagram of the apparatus shown in Fig. 1.

Fig. 2 is a schematic showing of the components of Fig. 1. The transmitter 15 and receiver 55 are shown as "Selsyn" units including multi-phase stator windings 21 and 22, respectively, and rotor windings 23 and 24, respectively. Transmitter rotor winding 23 is adapted to be angularly displaced within stator windings 21, relative to receiver rotor winding 24, by a shaft 26 which is connected to selector 10, which may include a knob 27 having a pointer 28 adapted to cooperate with indicia 31.

A source of alternating current is connected to rotor winding 23 through leads 32. Due to the transformer action between rotor winding 23 and stator windings 21, multi-phase sinusoidal alternating fields are set up in stator windings 21. Leads 33 symmetrically interconnect stator windings 21 and 22 so that sinusoidal fields, corresponding in space and time relation with those in stator windings 21, are set up in stator windings 22 of unit 55. When rotor windings 23 and 24 have a relative angular displacement of 90 electrical degrees within their respective stator windings, no voltage is induced in receiver rotor winding 24.

When transmitter rotor winding 23 is angularly displaced from such 90 degree or "null position" relative to rotor winding 24, as through actuation of knob 27 to preselect a new position for member 20, an output voltage is induced in rotor winding 24. Leads 34 from winding 24 introduce this output voltage as an input signal or control voltage to electronic control circuit 60. The magnitude of the resultant control voltage is proportional to the sine of the relative angle of displacement from null; and the phase of this control voltage is dependent on the sense of the angular displacement. The control signal effects operation of the control circuits in unit 60 to effect selective connection of motor 30 to its source of power as will be described.

Motor 30 is connected to its source of power over a circuit which includes an energizing winding for electromagnetic clutch and brake unit 35 in circuit connection with the motor. For this purpose, where a series motor is used, one terminal of unit 35 is connected to unit 60 through lead 36, and the other terminal is connected to motor 30 through lead 37. The other two terminals of motor 30 are connected through leads 38 and 41 to terminals of limit switches 42 and 43. Leads 44 and 46 connect the other terminals of limit switches 42 and 43 to control unit 60. Energization of motor 30 and clutch and brake unit 35 connects motor 30 to a drive pinion 47. Drive pinion 47 operates jack screw 45 through a system of pinions and spur gears indicated generally at 40.

Gearing 40 causes jack screw 45 and member 20 to be operated at a reduced rate of speed with respect to motor 30. As described in said copending application Serial No. 483,515, jack screw 45 includes a screw member 51 having threaded engagement with a sleeve member 52. Relative rotation of jack screw members 51 and 52 effects extension and retraction of the jack screw to operate member 20. A spur gear 53 driven by a pinion 54, operates a shaft 56 connected to rotor 24 of unit 55. A worm 57 meshes with a worm gear 58 operating a pair of cams 61 and 62 which in turn cooperate with limit switches 42 and 43. Switches 42 and 43 may be so set that cams 61 and 62 will effect opening of the motor circuit when member 20 or jack screw 45 has mechanically reached its limit of operation in either direction.

As explained above, when there is a relative angular displacement from null in the position of rotor windings 23 and 24, a voltage is induced in rotor winding 24 proportional to the relative displacement from null. The voltage thus induced in winding 24 is applied through leads 34 to control unit 60 where, through connections to be described, it effects actuation of a differential relay for connecting motor 30 and clutch-brake unit 35 to a source of power for operation in a direction to restore coincidence between selector 10 and member 20. Unit 35 couples motor 30 to drive jack screw 45 through pinion 47 and gearing 40. At the same time, gear 53 and shaft 56 rotate receiver rotor winding 24 in correspondence with the movement of movable member 20.

When member 20 has reached the position corresponding to that indicated by pointer 28 of knob 27, receiver rotor winding 24 is geared to be in 90 degree or null relation with rotor winding 23. When rotor winding 24 thus is in null relation with rotor winding 23, the output or control signal voltage across its terminals will have decreased in value to zero. Hence there will be no signal input through leads 34 to unit 60. The effect of the rotor windings reaching a "null signal" position is to deenergize motor 30 and clutch 35 effecting substantially instantaneous stopping of movable member 20 due to the braking action of unit 35 on actuator 25. Due to gearing 53 and 54, rotor winding 24 is moved at a greatly reduced rate with respect to the rate of rotation of the armature of motor 30. To avoid any ambiguity of positioning, the total angular displacement of the position transmitter rotor 23, and therefore of position received rotor 24, designed to move in correspondence therewith, is limited to not more than 180° for the full range of control movement on member 20.

An important feature of the present invention is the impressing of counter or "anticipatory" signals upon control unit 60 respectively corresponding to the relative displacement of position selector 10 with respect to movable member 20 and in response to energization of motor 30. These countersignals are combined in unit 60 with the input or control signal from receiver 55. The effect of the countersignals is to reduce the effective value of the control signals applied to circuit 60 through leads 34, and effect deenergization or motor 30 somewhat before member 20 has been moved into coincidence with selector 10. As will be made clear hereinafter, the first mentioned countersignal is effective during periods of relatively large displacements of selector 10 relative to movable member 60, and the second mentioned countersignal during periods of relatively small displacements. Both anticipation or countersignal effects provide a "stepping-in" or "chattering-in" of member 20 into the "null" or final position, in a manner described hereinafter, inhibiting overshooting or hunting.

Such anticipation effects are greatly aided by a novel differential relay which reduces the operating potential applied to motor 30 upon relatively small positioning displacements. Additionally, the decelerating action of clutch-brake unit 35 on the armature of motor 30 assists in rapidly conditioning motor 30 for potential operation in the reverse direction.

Figure 3:
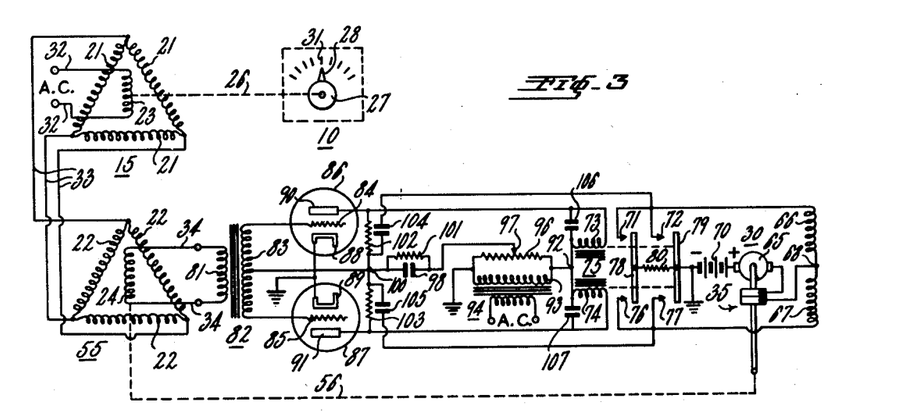
Fig. 3 is a schematic wiring diagram illustrating one embodiment of the electronic control circuit for the apparatus shown in Figs. 1 and 2.

Fig. 3 illustrates a control and anti-hunt arrangement for motor 30 as included in unit 60. Motor 30 may be a direct current series motor comprising an armature 65 and reversely wound field windings 66 and 67. One armature terminal is connected to one terminal, preferably the positive terminal, of a source of direct current, such as a low voltage aircraft battery or generator indicated at 70. The other armature terminal is connected, in series with the energizing coil of clutch-brake unit 35 to the common junction point 68 of field windings 66 and 67. The outer terminal of field winding 66 is connected to front contacts 71 and 72 associated with operating coil 73 of differential relay 75; and the outer terminal of field winding 67 is connected to front contacts 76 and 77 associated with operating coil 74 of relay 75.

Differential relay 75 includes a pair of pivoted armatures 78 and 79. Armature 78 is associated with front contacts 71, 76 and armature 79 with front contacts 72, 77. Armature 79 is connected to the negative grounded terminal of source 70. Armature 78 is connected to armature 79 through a voltage limiting resistor 80. It will be noted that armature 78 has to swing only a short distance to engage contacts 71 or 76, whereas armature 79 has to swing a much greater distance to engage contacts 72 or 77. This is an important feature of the invention, as will appear hereinafter.

Engagement of either armature 78, 79 with one of its contacts 71, 76 or 72, 77 will cause motor 30 to be energized through one field winding 66 or 67 for selective operation in reverse directions. Use of differential relay 75 with the control circuit of the invention permits any size motor to be used for motor 30, depending upon the particular source of power economically available and the particular application for which the motor is intended.

The terminals of rotor winding 24 are connected through leads 34 to the primary winding 81 of a grid transformer 82, thus impressing the control signal thereon. The opposite terminals of secondary winding 83 of transformer 82 are respectively connected to the grids 84 and 85 of a pair of electronic amplifier tube paths 86 and 87 provided with grounded cathodes 88, 89 and anodes 90, 91, respectively. Anodes 90, 91 are each connected to one relay coil 73, 74 and the opposite terminals of the coils are connected, through junction 92 to one terminal of secondary winding 93 of plate transformer 94. The opposite terminal of winding 93 is grounded. The primary winding 95 of transformer 94 is connected to a source of alternating current which, for control purposes, is the same reference source to which rotor winding 23 is connected. It will be noted that the connections are such that the input or signal voltage is impressed in phase opposition on grids 84, 85 and the reference alternating potential is impressed in in-phase relation on plates or anodes 90, 91.

A potentiometer 96 is connected across secondary winding 93, and its adjustable contact 97 is connected, through a condenser 98 and a junction point 100, to the mid-point of grid transformer secondary winding 83. A resistance 101 is connected in parallel with condenser 98 for a purpose to be described. Junction point 100 is connected through resistors 102, 103 to anodes 90, 91, respectively. Grid current limiting resistors, not shown, may be provided in a manner well known to those skilled in the art.

For a purpose to be described, contacts 71, 72 of relay 75 are connected to anode 90 through a condenser 104 and resistor 102. Similarly contacts 76, 77 are connected to anode 91 through a condenser 105 and resistor 103. Condensers 104, 105 prevent flow of direct current from source 70 to the control circuit.

The use of differential relay 75 is an important feature in the circuit of the invention. As diagrammatically shown, pivoted armatures 78 and 79 are mechanically inter-connected and common to both operating coils 73 and 74. This feature prevents accidental simultaneous energizing of motor 30 for reverse directions of rotation at the same time, as might occur were two independent relays with separate relay armatures used. To permit engagement of armature 79 with either of its contacts when armature 78 is already in engagement with one of its contacts, one or both armatures may be made of resilient material or the contacts themselves may be resiliently mounted. Constructional details of a suitable differential relay are described more fully hereinafter with reference to Figs. 4, 5 and 6.

Under "null" conditions, such as when rotors 23 and 24 are in substantially coincident relation, the effective bias of grids 84, 85 is so adjusted, by potentiometer 96, that tubes 86, 87 are activated to pass only a relatively small current through coils 73, 74. The currents through both coils are equal. In a typical practical example, such current might be of the order of six milliamperes. As the strength of both coils is equal, the effect on armatures 78, 79 is balanced and the armatures remain in the neutral or disengaged position.

When a relatively small control signal is impressed on transformer 82 in response to a small relative displacement of rotors 23, 24, the current flow through one coil is increased a small amount and that through the other coil is decreased substantially the same amount. For example, in small displacements such current increase and decrease might be of the order of one milliampere. The current in one coil would then be seven milliamperes and that in the other coil five milliamperes. The net relay or differential current would thus be two milliamperes.

This relatively small current would swing both armatures 78, 79 in one direction or the other depending upon the "sense" of the control signal. Armature 78 would engage contact 71 or 76, connecting motor 30 to source 70 through voltage limiting resistor 80. Motor 30 would thus operate at a reduced speed to move rotor 24 into coincidence with rotor 23.

During periods of relatively large displacment of rotor 23 from null with respect to rotor 24, the relay or differential current might be of the order of four to six milliamperes. The differential effect of coils 73, 74 will then be sufficient to increase the effect on armatures 78, 79 and engage armature 79 with contact 72 or 77. Such engagement shunts resistor 80 and connects motor 30 directly to source 70. Motor 30 then operates at full speed to move rotor 24 ino coincidence with rotor 23. When the rotors are near coincidence, the control signal will have decreased to an extent where the differential current in coils 73, 74 will be insufficient to retain armature 79 in engagement with the selected one of its front contacts. Resistor 80 thus will be cut back into the motor circuit, effecting a reduction of the motor speed during the final approach of rotors 23, 24 to the coincident or "null" position.

The described effect greatly increases the sensitivity of response of the control circuit while at the same time contributing to the inhibition of hunting of rotors 23, 24 on either side of the "null" or coincident position. Under the same conditions, the normal or "null" current through two separate relays must be reduced in value to prevent accidental operation of the relay armatures, due to the absence of the "balancing" effect, characteristic of differential relay 75. Also, if the current through one such separate relay is increased due to a control signal, the decrease in current through the other separate relay will not assist in operation of the selected relay armature. Thereby, the sensitivity, as compared to the present circuit, is greatly decreased, as a pair of separate relays require a greater signal or control voltage to effect operation of their armatures.

The anti-hunting characteristics are improved by the use of two pivoted armatures, one engageable with its contacts during prevalence of small magnitude control signals and the other during prevalence of larger magnitude control signals. Thus, one armature connects the motor to the current source through a voltage limiting resistor, reducing the motor speed when there is only a relatively small displacement of rotors 23, 24. The other armature shunts resistor 80, permitting the motor to operate at full speed upon relatively large displacements. Additionally, upon relatively large displacements, the voltage limiting resistor is cut into the motor circuit when rotors 23, 24 near null position. This reduces the motor speed during the final approach to coincidence. Accordingly, the anti-hunt characteristics of the circuit of the invention are greatly enhanced.

The operation of the system so far described is as follows. Upon a displacement of rotor 23 through movement of knob 27, an alternating current "control" voltage is induced in rotor 24 and impressed, through leads 34, on primary winding 81 of grid transformer 82. Through secondary winding 83, a proportionately higher voltage is impressed, in phase opposition, on grids 84, 85. Anodes 90, 91 are energized in phase by plate transformer 94. Depending upon the direction or "sense" of relative displacement of rotor 23 from null with respect to rotor 24, one tube 86, 87 will become more conductive and the other less conductive, as the "sense" or phase of the control signal voltage on grids 84, 85 will be in-phase with the anode voltage of one tube 86, 87 and out-of-phase with the anode voltage of the other tube.

Accordingly, armatures 78, 79 of relay 75 will be swung in one direction or the other depending upon the phase of the control voltage or sense of rotor 23 displacement. Depending upon the relative magnitude of the control voltage, either armature 78 only, or both armatures 78, 79 will engage the selected front contact or contacts, as described above. Motor 30 and clutch-brake unit 35 will be energized to cause motor 30 to rotate in a direction to operate member 20 and bring rotor 24 into angular coincidence with rotor 23. When the rotors are again in null relation, which occurs when movable member 20 coincides in relative position with selector knob 27, the input or signal voltage to transformer 82 will have decreased to its null value, thus deenergizing relay 75. The motor circuit is thus broken at relay 75 and clutch-brake unit 35 operates to disconnect motor 30 from actuator 45 and movable member 20 and to substantially instantly arrest motion of the actuator and member 20. Additionally, unit 35 rapidly decelerates the armature of motor 30 to rapidly condition the motor for potential rotation in the reverse direction; as will be described more fully hereinafter.

Despite such action of unit 35, there may be a tendency for motor 30 to move rotor 24 beyond the null or coincident position. This will induce a reversely directed countersignal into transformer 82, effecting energization of motor 30 for rotation in the reverse direction before a steady state is reached. Suitable anticipation or anti-hunting means are provided to prevent such tendency of the system to hunt.

A counter or anti-hunt signal during periods of relatively large displacements is provided in the following manner. During selectively increased activation of one tube 86 or 87 in response to displacement of selector knob 27, an increased potential is impressed across condenser 98 and resistance 101. Such increase occurs during the time knob 27 is being displaced with respect to member 20. The final voltage across condenser 98 will be equal to the peak voltage drop across resistor 101. As motor 30 starts to rotate member 20 into coincidence with selector knob 27, the counter-signal potential stored in condenser 98 is impressed on the anodes and grids of tubes 86, 87. Moreover, the charge on condenser 98 at the same time leaks off through resistor 101 and resistors 102 and 103. The ohmic values of resistors 101, 102 and 103 are selected to give the desired time constants for operation of the anti-hunt or anticipation arrangement.

However, the leaking action is at such a rate that the counterpotential from condenser 98 impressed on grids 84, 85 decreases at a rate less than the rate of decrease of the signal voltage impressed on the grids due to movement of rotor 24 toward angular null relation with rotor 23. Such counterpotential is likewise in a direction to oppose the signal voltage and the activating anode potential.

The effect of these two actions is to reduce the current flow through the selectively activated tube 86, 87 to its normal value before rotor 24 attains null relation with rotor 23, and increase the current flow through the other tube to its normal value. The operating currents in coils 73, 74 become balanced, deenergizing relay 75 and disconnecting motor 30 from source 70. Movement of rotor 24 then stops, with the motor in non-null angular relation to rotor 23. The charge on condenser 98 continues to leak off through resistors 101, 102 and 103. Accordingly, after an interval of time, the values of the activating anode potential and of the signal grid voltage become sufficiently greater than the counterpotential to effect operation of relay 75. Motor 30 again moves rotor 24 toward null relation with rotor 23. The net result of these actions is to effect a "chattering-in" or "stepping-in" of motor 20 and hence of rotor 24 into the final or null position, with no resultant hunting or overshooting.

In effect, the "null zone," wherein the relay coil currents are balanced and the coils have no net effect on armatures 78, 79, is broadened temporarily during relative displacement from null of rotors 23, 24. Due to the broadened "null zone," motor 30 is deenergized before rotor 24 has been moved into null relation with rotor 23. In other words, the invention control system "anticipates" the null position of rotors 23 and 24. The "anticipation" compensates for any inertia of the moving system and any time delay in the operation of the differential relay. However, the arrangement thus far described is effective only during periods of relatively large displacements from null of rotor 23 with respect to rotor 24 as, during periods of relatively small displacements, there is not sufficient time for a counterpotential of effective value to be stored in condenser 98.

An effective anti-hunting or anticipation arrangement during periods of small relative displacements from null of rotors 23 and 24 is provided in the following manner. Immediately upon operation of relay 75, contacts 71, 72 or 76, 77 are connected to the grounded negative terminal of source 70. Thus, through condensers 104, 105, anodes 90, 91 are connected to such negative terminal, grounding the alternating current activating anode potential. The alternating current voltage drop, however, is limited due to resistors 102, 103. The effective alternating current potential applied to anodes 90, 91 is reduced immediately relay 75 is energized. The effect of this is to immediately deactivate the selectively activated tube 86, 87 and thus restore relay 75 to its non-operated position before rotor 24 has been moved into null relation with rotor 23.

Immediately upon opening of relay 75, the ground is removed from the alternating current circuit of anodes 90, 91, and thus tube 86 or 87 will again become selectively activated to close relay 75. Motor 30 again moves rotor 24 toward null relation with rotor 23. However, upon closing of relay 75, the alternating current anode potential is again grounded, effecting opening of relay 75. This also effects a chattering-in or stepping-in of the motor to the final position. In this case also the null zone is broadened. It will be understood that condensers 104, 105 prevent any flow of direct current into the electronic control circuit.

Condensers 106, 107 are connected in shunt with relay coils 73 and 74, respectively, to by-pass alternating current around the coils and thus prevent chattering or hunting of armatures 78, 79. In other words, the rectified direct current due to the rectification action of tubes 86, 87 passes directly through the relay coils, while the alternating current of the electronic circuit is shunted around the coils through condensers 106, 107.

An important feature of the invention is the differential relay 75. Relay 75 may be the type described and claimed in my copending application Serial No. 579,759 filed February 26, 1945, for "Differential relay," now abandoned, and shown in Figures 4, 5 and 6 of the present drawings. The relay may comprise a base 108 having upstanding arms 109, 110 supporting a top plate 111. Opposing coils 73, 74 are secured to arms 109, 110, respectively, and may each be divided into two parts.

Figure 4:
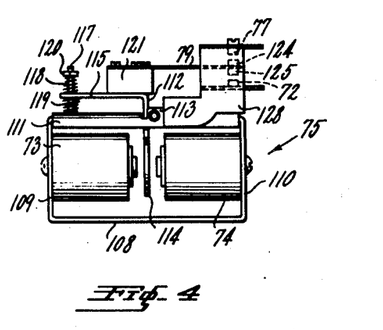
Fig. 4 is a side elevation view of a differential relay used in the apparatus.
Figure 5:
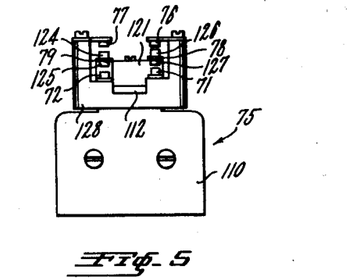
Fig. 5 is an end elevation view of the relay.
Figure 6:
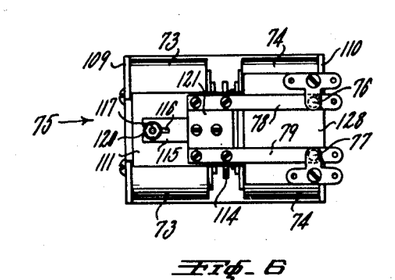
Fig. 6 is a plan view of the relay.

The armature structure comprises an angular metal member 112 pivotally mounted in ears 113 of plate 111 and having one arm 114 disposed centrally between coils 73, 74 and the other arm 115 extending parallel to and above plate 11. The outer end of arm 115 is slotted as at 116 to receive an adjusting stud 117 having coil springs 118, 119 thereon, disposed respectively above and below arm 115, and an adjusting nut 120. An insulating block 121 is mounted on arm 115 and supports a pair of resilient leaf spring armatures 78, 79 of conductive material such as copper or bronze. Contact buttons 124, 125 are mounted on the outer end of spring 79, and contact buttons 126, 127 are mounted on the outer end of spring 78.

The relay contact structure comprises a U-shaped insulating block 128 mounted on plate 111 and supporting front contacts 71, 72, 76 and 77. Referring to Fig. 5, it will be noted that contacts 71 and 76 are aligned with spring armature 78, and that contact 71 is relatively close to contact button 127 and contact 76 is relatively close to contact button 126. Similarly, contacts 72 and 77 are aligned with spring armature 79, contact 72 being spaced relatively further from contact button 125 than is pair 71—127 and contact 76 being spaced relatively further from contact button 124 than is pair 78—126.

Accordingly, if relay 75 is energized, upon receipt of a relatively weak signal, to swing arm 114 of armature 112 clockwise (as viewed in Fig. 4) toward coils 73, contact button 127 will engage contact 71. Upon receipt of a stronger signal of the same sense, arm 114 will be pulled closer to coils 73. Spring 78 will bend, permitting contact button 125 on spring 79 to engage contact 72. As explained above, this acts to cut out resistor 80, connecting motor 30 directly to source 70. A corresponding action takes place with respect to contacts 76 and 77 when armature 112 is moved counterclockwise (as viewed in Fig. 4) to bring arm 114 close to coils 74. The relay of Figs. 4, 5 and 6 thus functions exactly as the relay diagrammatically illustrated in Figure 3.

Figure 7:
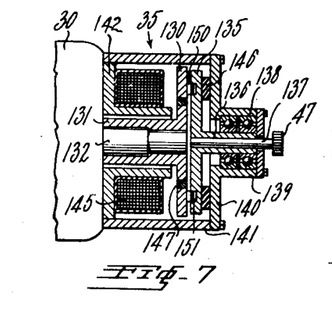
Fig. 7 is a longitudinal sectional view through an electromagnetic clutch and brake unit used in the apparatus.
Figure 8:
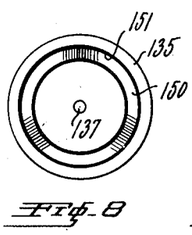
Fig. 8 is an elevation view of the driven disk and biasing spring of the unit shown in Fig. 7.

An important feature of the present invention is the electromagnetic clutch and brake unit 35 provided for connecting motor 30 to jack screw 45. As explained above, unit 35 is in electric circuit relation with motor 30 so that it is energized simultaneously with the motor to instantly couple the latter to actuator 45. When motor 30 is deenergized, unit 35 is simultaneously deenergized and instantly disconnects motor 30 from actuator 45, brakes the actuator and associated elements and rapidly decelerates the armature of motor 30. These actions are very effective in preventing overshooting and hunting of the motor drive and the control system and in rapidly conditioning the motor drive for potential operation in the reverse direction. The effect of motor momentum is thus substantially eliminated. The electromagnetic clutch and brake unit used in the present invention is generally similar to that described and claimed in Lear et al. Patent No. 2,267,114, issued December 23, 1941, for "Electromagnetic clutch" and assigned to the assignee of the present invention. However, unit 35 of the present invention additionally incorporates braking means for rapidly decelerating the motor armature, by dissipating its rotational energy, to quickly condition the motor drive for potential operation in the reverse direction.

Referring to Figs. 7 through 10, clutch and brake unit 35 includes a driving member 130 of magnetic material having a hub 131 keyed to the shaft 132 of armature 65 of motor 30. A driven clutch member 135, likewise of magnetic material, has a hub 136 secured to a driven shaft 137 on the outer end of which is secured drive pinion 47 of gearing 40. Hub 136 is mounted on ball bearings 138 in an extension 139 of end plate 140 secured to housing 141. A housing 142 of magnetic material surrounds hub 131 to complete the magnetic circuit for the clutch.

Mounted in the compartment thus formed is a magnetizing winding 145 which is preferably connected in either electrical series or electrical parallel relation with motor 30. A brake surface 146 of suitable material, such as cork, is mounted on end plate 140. As described in said Patent No. 2,267,114, driving member 130 may be provided with one or more inserts 147 of non-magnetic material to increase the number of magnetic flux inter-linkages between the driving and driven members of the clutch.

Figure 9:
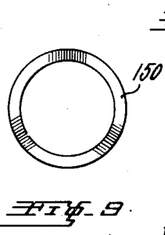
Fig. 9 is a front elevational view of the biasing spring.
Figure 10:
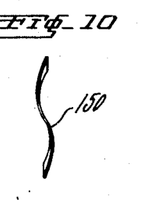
Fig. 10 is a side elevational view of the biasing spring.

Clutch members 130 and 135 are normally biased out of engagement by a sinusoidal annular spring 150, shown more clearly in Figs. 9 and 10. Spring 150 is preferably of non-magnetic material such as phosphor bronze, and is mounted in an annular groove 151 in the inner surface of clutch driven member 135. The spring is sinusoidally curved circumferentially and, by engagement with both clutch disks 130, 135, normally biases driven member into engagement with brake surface 146 to arrest motion of pinion 47.

Upon energization of winding 145, driven member 135 is magnetically attracted into frictional and magnetic coaction with driving member 130 to couple armature shaft 132 to pinion 47. The magnetic attraction between members 130, 135 overcomes the force of spring 150, which is collapsed into groove 151 of driven member 151. Upon deenergization of winding 145, which preferably occurs simultaneously with deenergization of motor 30, spring 150 instantaneously snaps driven disk 135 into engagement with braking surface 146. This instantly disconnects motor 30 from pinion 47 and effects immediate stopping of the driven system connected to pinion 47. At the same time, the frictional engagement of spring 150 with the then stationary disk 135 and with disk 130, attached to the motor armature, quickly dissipates the rotational energy of the motor armature, thus rapidly decelerating the same. Any tendency for the driven system to hunt on either side of the null position is effectively inhibited due to the instantaneous braking action of unit 35 when motor 30 is deenergized as the control signal reaches a "null" value when rotors 23 and 24 are in angular coincidence. At the same time, motor armature 65 is quickly decelerated to rapidly condition the motor for potential operation in the reverse direction. Clutch and brake unit 35 is particularly effective in small or "inching" movement of the control system.

While specific embodiments of the invention have been described for the purpose of illustrating the principles thereof, it will be obvious to those skilled in the art that the invention may be otherwise embodied without departing from such principles.

What is claimed is:

1. A remote positioning control system for a movable member comprising, in combination, an actuator effective to position the movable member; an electric motor; mechanism operable to connect said motor to a source of power and to said actuator for selective rotation in either direction; a signal transmitting position selector; control means responsive to signals from said selector for operating said mechanism to energize said motor and connect it to said actuator for selective rotation in either direction in accordance with the sense of the signals; and a brake device effective upon deenergization of said motor to instantly arrest motion of said actuator and the movable member, and including brake means operative to rapidly decelerate the armature of said motor to rapidly condition said motor for potential operation in the reverse direction of rotation.

2. A remote positioning control system for a movable member comprising, in combination, an actuator effective to position the movable member; an electric motor; mechanism operable to connect said motor to a source of power for selective rotation in either direction; a signal transmitting position selector; control means responsive to signals from said position selector for operating said mechanism to energize said motor for selective rotation in either direction in accordance with the sense of the signals; a clutch and brake unit operative, upon energization of said motor, to connect said motor to said actuator and, upon deenergization of said motor, to disconnect said motor from said actuator and instantly arrest motion of said actuator and the movable member, and including brake means operative to rapidly decelerate the armature of said motor to rapidly condition said motor for potential operation in the reverse direction of rotation.

3. A remote positioning control system for a movable member comprising, in combination, an actuator effective to position the movable member; a reversible electric motor; mechanism, including relay means, operable to connect said motor to a source of power for selective rotation in either direction; a signal transmitting position selector; control means responsive to signals from said selector for operating said mechanism to energize said motor for selective rotation in either direction in accordance with the sense of the signals; said relay means varying the voltage applied from the source to said motor in accordance with the magnitude of the signals; a clutch and brake unit operative, upon energization of said motor, to connect said motor to said actuator and, upon deenergization of said motor, to disconnect said motor from said actuator and instantly arrest motion of said actuator and the movable member and including brake means operative to rapidly decelerate the armature of said motor to rapidly condition said motor for potential operation in the reverse direction of rotation.

4. A remote positioning control system for a movable member comprising, in combination, an actuator effective to position the movable member; an electric motor; mechanism operable to connect said motor to a source of power for selective rotation in reverse directions; an electromagnetic clutch having an energizing winding in circuit relation with said motor and effective, upon energization of said motor, to connect said motor to said actuator and, upon deenergization of said motor, to disconnect the same from said actuator; a brake effective upon disengagement of said clutch to instantly arrest motion of said actuator and the movable member; braking means operable concurrently with said brake to decelerate the armature of said motor to rapidly condition said motor for potential operation in the reverse direction of rotation; a signal transmitting position selector; and control means responsive to signals from said selector for operating said mechanism to energize said motor and connect it to said actuator for selective rotation in either direction in accordance with the sense of the signals.

5. A remote positioning control system for a movable member comprising, in combination, an actuator effective to position the movable member; a direct current electric motor; relay means operable to connect said motor to a source of direct current for selective rotation in reverse directions; an electromagnetic clutch and brake unit including a clutch having an energizing winding in circuit relation with said motor and effective upon energization of said motor, to connect said motor to said actuator and, upon deenergization of said motor, to disconnect the same from said actuator, a brake effective upon disengagement of said clutch to instantly arrest motion of said actuator and the movable member and braking means operable concurrently with said brake to decelerate the armature of said motor to rapidly condition said motor for potential operation in the reverse direction of rotation; a signal transmitting position selector; and control means responsive to signals from said selector for operating said relay means to energize said motor and connect it to said actuator for selective rotation in either direction in accordance with the sense of the signals; said relay means varying the voltage applied from the source of direct current to said motor in accordance with the magnitude of the signals.

6. A remote positioning control system for a movable member comprising, in combination, an actuator effective to position the movable member; an electric motor; first switch means operative to connect said motor through a voltage limiting resistor to a source of power for selective rotation in reverse directions; second swich means operative to shunt said voltage limiting resistor; a clutch operative, upon energization of said motor, to connect said motor to said actuator and, upon deenergization of said motor, to disconnect said motor from said actuator; a signal transmitting position selector; control means effective to operate said first swich means in response to signals of relatively small magnitude from said selector and to operate said first and second switch means in response to signals of relatively large magnitude from said selector, to energize said motor and connect it to the source of power for selective rotation in either direction in accordance with the sense of the signals; and a brake device effective upon deenergization of said motor to instantly arrest motion of said actuator and the movable member, and including brake means operative to rapidly decelerate the armature of said motor, to rapidly condition said motor for potential operation in the reverse direction of rotation.

7. A remote positioning control system for a movable member comprising, in combination, an actuator effective to position the movable member; an electric motor; first switch means operative to connect said motor through a voltage limiting resistor to a source of power for selective rotation in reverse directions; second swich means operative to shunt said voltage limiting resistor; a clutch and brake unit operative, upon energization of said motor, to connect said motor to said actuator and, upon deenergization of said motor, to disconnect said motor from said actuator and instantly arrest motion of said actuator and the movable member and including brake means operative to rapidly decelerate the armature of said motor to rapidly condition said motor for potential operation in the reverse direction of rotation; a signal transmitting position seelctor; and control means effective to operate said first switch means in response to signals of relatively small magnitude from said selector and to operate said first and second switch means in response to signals of relatively large magnitude from said selector, to energize said motor and connect it to the source of power for selective rotation in either direction in accordance with the sense of the signals.

8. A remote positioning control system for a movable member comprising, in combination, an actuator effective to position the movable member; an electric motor; first switch means operative to connect said motor through a voltage limiting resistor to a source of power for selective rotation in reverse directions; second switch means operative to shunt said voltage limiting resistor; an electromagnetic clutch and brake unit including a clutch having an energizing winding in circuit relation with said motor and effective, upon energization of said motor, to connect said motor to said actuator and, upon deenergization of said motor, to disconnect the same from said actuator, a brake effective upon disengagement of said clutch to instantly arrest motion of said actuator and the movable member and braking means operable concurrently with said brake to decelerate the armature of said motor to rapidly condition said motor for potential operation in the reverse direction of rotation; a signal transmitting position selector; and control means effective to operate said first switch means in response to signals of relatively small magnitude from said selector and to operate said first and second switch means in response to signals of relatively large magnitude from said selector, to energize said motor and connect it to the source of power for selective rotation in either direction in accordance with the sense of the signals.

9. A remote positioning control system for a movable member comprising, in combination, an actuator effective to position the movable member; a direct current electric motor; first switch means operative to connect said motor through a voltage limiting resistor to a source of direct current for selective rotation in reverse directions; second switch means operative to shunt said voltage limiting resistor; an electromagnetic clutch and brake unit including a clutch having an energizing winding in circuit relation with said motor and effective upon energization of said motor, to connect said motor to said actuator and, upon deenergization of said motor, to disconnect the same from said actuator, a brake effective upon disengagement of said clutch to instantly arrest motion of said actuator and the movable member and braking means operable concurrently with said brake to rapidly condition said motor for potential operation in the reverse direction of rotation; a signal transmitting position selector; and control means effective to operate said first switch means in response to signals of relatively small magnitude from said selector and to operate said first and second switch means in response to signals of relatively large magnitude from said selector, to energize said motor and connect it to the source of direct current for selective rotation in either direction in accordance with the sense of the signals.

10. A remote positioning control system for a movable member comprising, in combination, an actuator effective to position the movable member; an electric motor; a magnetic driving member connected to the armature of said motor; a magnetic driven member in driving relation with said actuator; a brake surface arranged adjacent said driven member; resilient means disposed between and frictionally engaging said driving and driven members and normally urging the same apart and said driven member into engagement with said brake surface to instantly arrest motion of said actuator and the movable member and to decelerate said armature to rapidly condition said motor for potential operation in the reverse direction of rotation; a magnetizing winding in circuit relation with said motor and operative, upon energization thereof, to effect driving engagement of said driving and driven members; relay means operable to connect said motor to a source of power for selective rotation in reverse directions; a signal transmitting position selector; and control means responsive to signals from said selector for operating said relay means to energize said motor and connect it to said actuator for selective rotation in either direction in accordance with the sense of the signals; said relay means varying the voltage applied from the source of power to said motor in accordance with the magnitude of the signals.

11. A remote positioning control system for a movable member comprising, in combination, a position selector; a signal transmitter operatively associated with said selector; an actuator effective to position the movable member; an electric motor; a clutch and brake unit operative, upon energization of said motor, to connect said motor to said actuator and, upon deenergization of said motor, to disconnect said motor from said actuator and instantly arrest motion of said actuator and the movable member and including brake means operative to rapidly decelerate the armature of said motor; a signal receiver operable in accordance with movement of the movable member; electrical means connecting said transmitter and receiver; a differential relay including a pair of operating coils and pivoted armature means operable to connect said motor to a source of power; a pair of electronic tube paths each connected in circuit relation with one of said coils and a reference source of alternating current; and means including circuit connections for selectively impressing a signal voltage on said tube paths in response to signals derived by said receiver from said transmitter when the movable member and said selector are out of coincidence to increase the conductivity of one tube path and decrease the conductivity of the other to unbalance the current through said coils to operate said armature means to energize said motor and connect it to said actuator through said clutch for rotation in a direction to restore coincidence between the movable member and said selector; said differential relay varying the voltage applied from the source of power to said motor in accordance with the magnitude of the signal voltage.

12. A remote positioning control system for a movable member comprising, in combination, a position selector; a signal transmitter operatively associated with said selector; an actuator effective to position the movable member; an electric motor; a clutch and brake unit operative, upon energization of said motor, to connect said motor to said actuator and, upon deenergization of said motor, to disconnect said motor from said actuator and instantly arrest motion of said actuator and the movable member and including brake means operative to rapidly decelerate the armature of said motor; a signal receiver operable in accordance with movement of the movable member; electrical means connecting said transmitter and receiver; a differential relay including a pair of operating coils and pivoted armature means operable to connect said motor to a source of power; a pair of electronic tube paths each connected in circuit relation with one of said coils and a reference source of alternating current; means including circuit connections for selectively impressing a signal voltage on said tube paths in response to signals derived by said receiver from said transmitter when the movable member and said selector are out of coincidence to increase the conductivity of one tube path and decrease the conductivity of the other to unbalance the current through said coils to operate said armature means to energize said motor and connect it to said actuator through said clutch for rotation in a direction to restore coincidence between the movable member and said selector; said differential relay varying the voltage applied from the source of power to said motor in accordance with the magnitude of the signal voltage; and means operative in response to operation of said relay armature means to condition said tube paths to operate said relay to deenergize said motor before said selector and the movable member attain coincidence whereby to inhibit relative hunting thereof.

13. A remote positioning control system for a movable member comprising, in combination, a position selector; a signal transmitter operatively associated with said selector; an actuator effective to position the movable member; an electric motor; a clutch and brake unit operative, upon energization of said motor, to connect said motor to said actuator and, upon deenergization of said motor, to disconnect said motor from said actuator and instantly arrest motion of said actuator and the movable member and including brake means operative to rapidly decelerate the armature of said motor; a signal receiver operable in accordance with movement of the movable member; electrical means connecting said transmitter and receiver; a differential relay including a pair of operating coils and pivoted armature means operable to connect said motor to a source of power; a pair of electronic tube paths each connected in circuit relation with one of said coils and a reference source of alternating current; means including circuit connections for selectively impressing a signal voltage on said tube paths in response to signals derived by said receiver from said transmitter when the movable member and said selector are out of coincidence to increase the conductivity of one tube path and decrease the conductivity of the other to unbalance the current through said coils to operate said armature means to energize said motor and connect it to said actuator through said clutch for rotation in a direction to restore coincidence between the movable member and said selector; said differential relay varying the voltage applied from the source of power to said motor in accordance with the magnitude of the signal voltage; means for storing a countersignal potential during movement of said selector and the movable member out of coincidence and corresponding to the resultant relative displacement thereof; and circuit means for impressing such countersignal potential on said tube paths in opposition to the signal voltage thereon during movement of movable member and said selector into coincidence to condition said tube paths to operate said relay to deenergize said motor before said selector and the movable member attain coincidence whereby to inhibit relative hunting thereof.

14. A remote positioning control system for a movable member comprising, in combination, a position selector; a signal transmitter operatively associated with said selector; an actuator effective to position the movable member; an electric motor; a clutch and brake unit operative, upon energization of said motor, to connect said motor to said actuator and, upon deenergization of said motor, to disconnect said motor from said actuator and instantly arrest motion of said actuator and the movable member and including brake means operative to rapidly decelerate the armature of said motor; a signal receiver operable in accordance with movement of the movable member; electrical means connecting said transmitter and receiver; a differential relay including a pair of operating coils and pivoted armature means operable to connect said motor to a source of power; a pair of electronic tube paths each connected in circuit relation with one of said coils and a reference source of alternating current; means including circuit connections for selectively impressing a signal voltage on said tube paths in response to signals derived by said receiver from said transmitter when the movable member and said selector are out of coincidence to increase the conductivity of one tube path and decrease the conductivity of the other to unbalance the current through said coils to operate said armature means to energize said motor and connect it to said actuator through said clutch for rotation in a direction to restore coincidence between the movable member and said selector; said differential relay varying the voltage applied from the source of power to said motor in accordance with the magnitude of the signal voltage; means for storing a counter signal potential during movement of said selector and the movable member out of coincidence and corresponding to the resultant relative displacement thereof, and including means for dissipating such stored potential, as the movable member and said selector are moved toward coincidence, at a rate less than the rate of decrease of the signal potential due to such last-named movement; and circuit means for impressing such countersignal potential on said tube paths in opposition to the signal voltage thereon during movement of movable member and said selector into coincidence to condition said tube paths to operate said relay to deenergize said motor before said selector and the movable member attain coincidence whereby to inhibit relative hunting thereof.

15. A remote positioning control system for a movable member comprising, in combination, a position selector; a signal transmitter operatively associated with said selector; an actuator effective to position the movable member; a direct current electric motor; an electromagnetic clutch and brake unit including a clutch having an energizing winding in circuit relation with said motor and effective, upon energization of said motor, to connect said motor to said actuator and, upon deenergization of said motor, to disconnect the same from said actuator, a brake effective upon disengagement of said clutch to instantly arrest motion of said actuator and the movable member and braking means operable concurrently with said brake to decelerate the armature of said motor to rapidly condition said motor for potential operation in the reverse direction of rotation; a signal receiver operable in accordance with movement of the movable member; electrical means connecting said transmitter and receiver; a differential relay including a pair of operating coils, a first pivoted armature connected to a source of direct current through a voltage limiting resistor and a second pivoted armature in shunt with said resistor; a pair of electronic tube paths each connected in circuit relation with one of said coils and a reference source of alternating current; means including circuit connections for selectively impressing a signal voltage on said tube paths in response to signals derived by said receiver from said transmitter when the movable member and said selector are out of coincidence to increase the conductivity of one tube path and decrease the conductivity of the other to unbalance the current through said coils to selectively operate said armatures to energize said motor and connect it to said actuator through said clutch for rotation in a direction to restore coincidence between the movable member and said selector; said first armature connecting said motor to the source of direct current through said resistor to reduce the operating speed of said motor upon receipt of signals of relatively small magnitude and said second armature shunting said resistor to effect operation of said motor at an increase speed upon receipt of signals of relatively large magnitude; a first anti-hunting arrangement including means operative in response to operation of said relay armatures to immediately reduce the operating potential applied to said tube paths to condition said tube paths to operate said relay to deenergize said motor before said selector and the movable member attain coincidence whereby to inhibit relative hunting thereof; a second anti-hunting arrangement including means for storing a countersignal potential during movement of said selector and the movable member out of coincidence and corresponding to the resultant relative displacement thereof, and including means for dissipating such stored potential, as the movable member and said selector are moved toward coincidence, at a rate less than the rate of decrease of the signal potential due to such last-named movement; circuit means for impressing such countersignal potential on said tube paths in opposition to the signal voltage thereon during movement of movable member and said selector into coincidence to condition said tube paths to operate said relay to deenergize said motor before said selector and the movable member attain coincidence whereby to inhibit relative hunting thereof.

HERMAN NYGAARD.

REFERENCES CITED

The following references are of record in the file of this patent:

UNITED STATES PATENTS

| Number | Name | Date |
|---|---|---|
| 1,942,587 | Whitman | Jan. 9, 1934 |
| 2,085,442 | Newell | June 29, 1937 |
| 2,154,375 | Chambers | Apr. 11, 1939 |
| 2,287,002 | Moseley | June 16, 1942 |